US008558664B2

(12) United States Patent
Biondo et al.

(10) Patent No.: US 8,558,664 B2
(45) Date of Patent: Oct. 15, 2013

(54) PASSIVE APPROACH DETECTION SYSTEM AND METHOD USING A UNIDIRECTIONAL FOB

(75) Inventors: William A. Biondo, Beverly Hills, MI (US); David T. Proefke, Madison Heights, MI (US); Clark E. McCall, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 399 days.

(21) Appl. No.: 12/950,470

(22) Filed: Nov. 19, 2010

(65) Prior Publication Data

US 2012/0126943 A1 May 24, 2012

(51) Int. Cl.
*G05B 19/00* (2006.01)

(52) U.S. Cl.
USPC ......... 340/5.64; 340/5.33; 340/5.5; 340/5.61; 340/5.62; 340/5.63; 340/12.22; 340/12.5; 340/12.51; 455/419; 455/420

(58) Field of Classification Search
USPC ................ 340/5.1–5.72, 426.29, 12.22, 12.5, 340/12.51; 455/343.1, 418, 420
See application file for complete search history.

(56) References Cited

U.S. PATENT DOCUMENTS

2007/0085658 A1* 4/2007 King et al. .................. 340/5.72
2007/0200672 A1* 8/2007 McBride et al. ............ 340/5.72

* cited by examiner

*Primary Examiner* — Tai T Nguyen
*Assistant Examiner* — Ojiako Nwugo
(74) *Attorney, Agent, or Firm* — Cantor Colburn LLP

(57) ABSTRACT

A system and method of passive approach detection is provided. The method comprises: transmitting a plurality of data signals corresponding to multiple power levels respectively from a fob device based on motion detected in the fob device; each of the plurality of data signals includes initial bytes encoded with a power level and transmitter identification (ID); receiving one or more of the plurality of data signals at a receiver based on the distance between the fob device and the receiver; filtering out signals at a secondary processor by comparing one or more of the plurality of data signals received to a predetermined list of signals valid for reception; and transmitting a wake-up signal to a primary processor based on the comparison, the wake-up signal enabling the primary processor to transition from a sleep mode to a wake-up mode.

19 Claims, 3 Drawing Sheets

PASSIVE APPROACH DETECTION SYSTEM AND METHOD USING A UNIDIRECTIONAL FOB

FIELD OF THE INVENTION

The subject invention relates to a method and system for passive approach detection and, more specifically, to a passive approach detection system that utilizes on-board signal filtering and unidirectional fob with multi-signal communication.

BACKGROUND

Key fobs, or remote keyless entry devices, that unlock, for example, the driver's door, passenger doors, or the trunk lid are well known. Some key fobs control other user-preferred features such as seat position, radio station, and air control temperature settings. Many key fobs are manually activated by the user (active approach) as the vehicle is approached. Other key fobs transmit a signal in response to a low frequency query from the vehicle (passive approach), with the key fob signal being detected by the vehicle for activating the desired features.

Low frequency passive systems require continuous (periodic) transmission and typically have a limited range of less than two meters. However, the low frequency transmission communication period must be sufficiently long to reduce the current consumption of the transmission, while being short enough to allow a noticeable approach to activate the feature before the user arrives at the vehicle. These low frequency systems may provide less time than desired for the activation of, for example, approach lighting. As a result the user is already at or very near the vehicle when approach lighting is activated.

Furthermore, low frequency passive systems can cause unintentional actuations when the user is near the vehicle but does not desire to activate the functions. These unintentional activations cause an undesired drain on the vehicle and fob batteries and may create a security issue if the unintentional actuation renders the vehicle accessible. Low frequency passive systems may include provisions to deactivate the approach sensing after extended continuous activation; however, this may have the undesired result of not providing the vehicle user the expected operation when desired.

The use of vehicle based sensors or trigger criteria solve these unintentional actuations. However, these require the user to initiate features at the vehicle, which initiates the fob. Furthermore, advanced activation of approach lighting is typically unavailable.

Accordingly, it is desirable to provide a system that enables passive approach detection using a unidirectional fob and reduces parasitic current consumption of a vehicle while managing fob battery life.

SUMMARY OF THE INVENTION

In one exemplary embodiment of the present invention a method of passive approach detection is provided. The method comprising transmitting a plurality of data signals corresponding to multiple power levels respectively from a fob device upon motion being detected in the fob device wherein each of the plurality of data signals includes initial bytes encoded with a power level and transmitter identification (ID), receiving one or more of the plurality of data signals at a receiver based on the distance between the fob device and the receiver, filtering out signals at a secondary processor by comparing one or more of the plurality of data signals received to a predetermined list of signals valid for reception and transmitting a wake-up signal to a primary processor based on the comparison, the wake-up signal enabling the primary processor to transition from a sleep mode to a wake-up mode.

In another exemplary embodiment of the present invention a passive approach detection system is provided. The system comprises a fob device configured to transmit a plurality of data signals corresponding to multiple power levels respectively upon motion being detected in the fob device wherein each of the plurality of data signals includes initial bytes encoded with a power level and transmitter identification (ID). A receiver is communicatively coupled to the fob device to receive one or more of the plurality of data signals based on the distance between the fob device and the receiver. A secondary processor is communicatively coupled to the receiver to filter out signals by comparing one or more of the plurality of data signals received to a predetermined list of signals valid for reception. A primary processor is communicatively coupled to the secondary processor and configured to receive a wake-up signal transmitted by the secondary processor based on the comparison, wherein the wake-up signal enables the primary processor to transition from a sleep mode to a wake-up mode.

In yet another exemplary embodiment of the present invention a passive approach detection system is provided. The system includes a fob device configured to transmit a plurality of data signals corresponding to multiple power levels respectively upon motion being detected in the fob device, wherein each of the plurality of data signals includes initial bytes encoded with a power level and a transmitter identification (ID). A receiver is communicatively coupled to the fob device for receiving one or more of the plurality of data signals based on the distance between the fob device and the receiver. A secondary processor is communicatively coupled to the receiver to filter out signals by comparing one or more of the plurality of data signals received to a predetermined list of signals valid for reception. A primary processor is communicatively coupled to the secondary processor and is configured to receive a wake-up signal transmitted by the secondary processor based on the comparison, wherein the wake-up signal enables the primary processor to transition from a sleep mode to a wake-up mode and wherein the plurality of data signals are transmitted periodically for a predetermined amount of time in response to the fob device being in continuous motion past a predefined motion timeout, the fob device communicating to the receiver in a unidirectional manner.

The above features and advantages and other features and advantages of the present invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
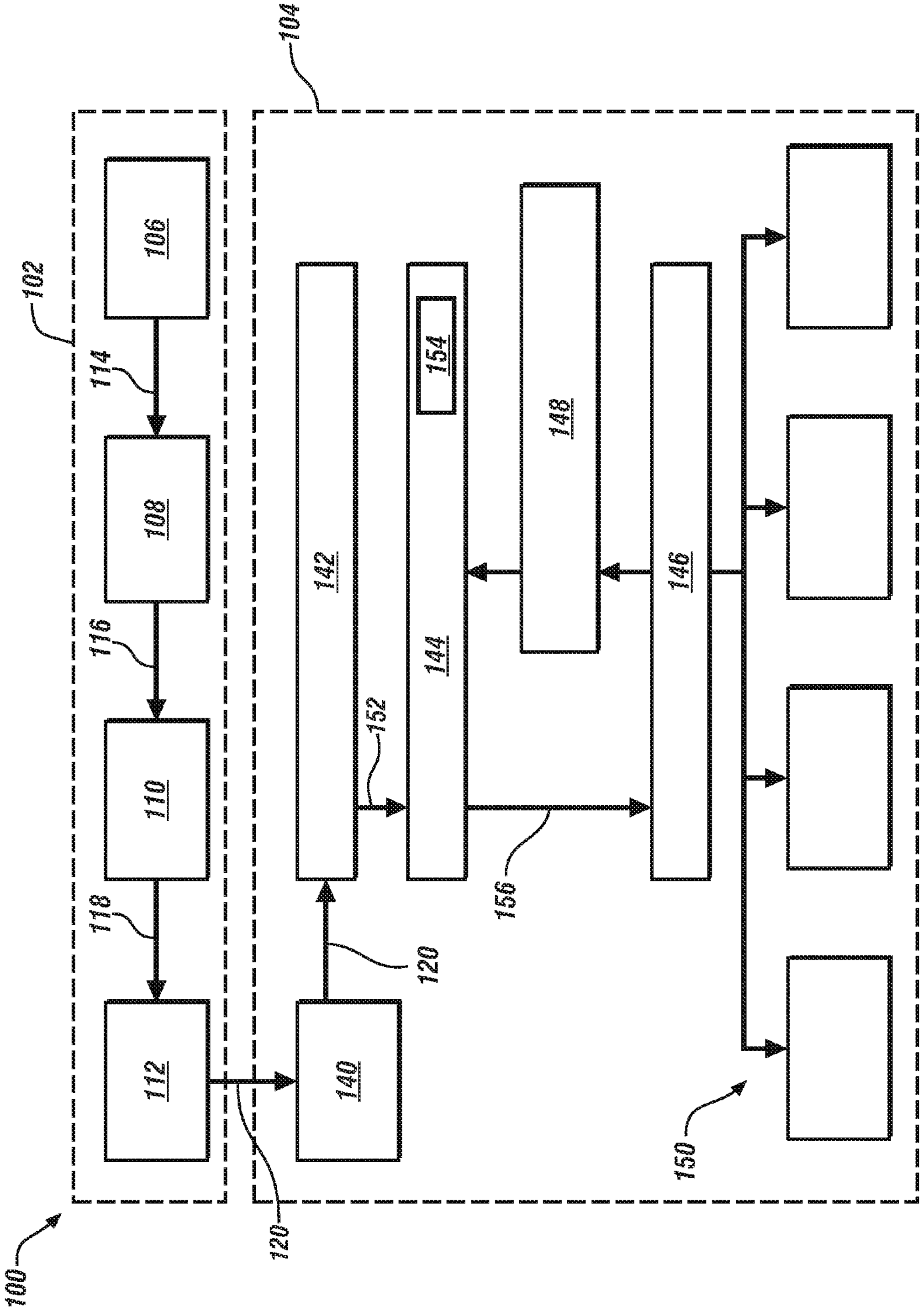
FIG. 1 is a schematic diagram of a passive approach detection system using a unidirectional fob device in signal communication with a vehicle according to an exemplary embodiment.

The following description is merely exemplary in nature and is not intended to limit the present disclosure, application or uses. It should be understood that throughout the drawings, corresponding reference numerals indicate like or corresponding parts and features.

Exemplary embodiments of the present invention provide systems and methods for passive approach detection using a unidirectional fob. In an exemplary embodiment, the system includes a fob device that transmits a plurality of multi-power level data signals corresponding to multiple power levels respectively upon motion being detected in the fob device, where the power level of each data signal is encoded within initial bytes of the same. In an exemplary embodiment, transmitter identification (ID) indicative of the transmitting fob device is encoded within initial bytes of each data signal. In an exemplary embodiment, the system employs on-board filtering to filter signals out based on power level and transmitter ID. In another exemplary embodiment, the system encodes power levels with received signal strength indication (RSSI) to further distinguish valid signals from invalid signals.

These exemplary embodiments enable passive approach detection with a unidirectional fob providing the detection of actual approach and not just presence detection to activate triggering events, such as, approach lighting and other features while maintaining fob battery life. These exemplary embodiments also enable a system (e.g., vehicle) and/or components thereof to remain in a sleep or semi-awake state until actual approach is detected, thereby reducing parasitic current impact to the system. Furthermore, encoding power levels within the first bytes of a plurality of data signals respectively enables the enhancement of presence detection using RSSI according to an exemplary embodiment.

For all general purposes, the term "signal" as used herein is defined as any electrical signal or any stored or transmitted value. For example, a signal can comprise a voltage, or a current. Further, a signal can comprise any stored or transmitted value such as binary values, scalar values or the like.

Turning now to the drawings, FIG. 1 illustrates a schematic diagram of the basic elements of a passive approach detection system 100 using a unidirectional fob according to one exemplary embodiment. The passive approach detection system 100 comprises a fob device 102 in signal communication with a system 104, which for example, is a vehicle in accordance with one exemplary embodiment. Of course, the system 104 can be any type of system or subsystem with triggering features in accordance with other exemplary embodiments. For ease of discussion, exemplary embodiments will be discussed in the context of a vehicle.

The fob device 102 is configured to transmit a plurality of data signals corresponding to multi-power levels respectively to the vehicle 104 when motion is detected in the fob device 102 in order to trigger approach features in the vehicle 104.

The fob device 102 communicates to the vehicle 104 in a unidirectional manner according to an exemplary embodiment. The fob device 102 generally includes one or more sensing devices 106 communicatively coupled to a fob processor 108, which is communicatively coupled to a transmit circuit 110. The transmit circuit 110 is communicatively coupled to a transmit antenna 112 according to an exemplary embodiment. The transmit antenna 112 may be external to, or part of, the transmit circuit 110 and should not be limited to the configuration shown in FIG. 1. The one or more sensing devices 106 are configured to sense whether the fob device 102 is in motion. For descriptive purposes, FIG. 1 illustrates fob device 102 with a single sensing device 106 but may include two or more sensing devices 106. In an exemplary embodiment, the sensing device 106 is an accelerometer. Of course, the sensing device 106 can be any type of device configured to sense motion by the fob device 102.

The sensing device 106 is configured to generate a motion signal, which is generally indicated by arrow 114. The motion signal 114 is indicative that the fob device 102 is in motion. During operation, the sensing device 106 transmits the motion signal 114 to the fob processor 108 when the fob device 102 is in motion. The fob processor 108 detects that the fob device 102 is in motion through its receipt of the motion signal 114 or its evaluation thereof.

In an exemplary embodiment, the fob processor 108 controls multi-power level transmission from the fob device 102 to the vehicle 104. The fob processor 108 includes a motion timer that resets or refreshes each time motion is detected by the fob processor 108. The fob processor 108 uses the motion timer to determine whether the fob device 102 has reached a predefined motion timeout signifying that the fob device 102 has been motionless for a predetermined time period. The fob processor 108 is configured to activate or deactivate multi-power level transmission to the vehicle 104 based on this determination. For example, if the fob processor 108 continues to receive motion signals from the sensing device 106 for longer than the predefined motion timeout, the fob processor 108 will activate multi-power level transmission. If the time since the fob processor 108 received a motion signal from the sensing device 106 is greater than the predefined motion timeout, the fob processor 108 operably deactivates multi-power level transmission and continues to detect whether the fob device 106 is in motion.

The fob processor 108 activates multi-power level transmission by processing the motion signal 114 from the sensing device 106 and communicating unmodulated data, which is generally indicated by arrow 116, to the transmit circuit 110. The transmit circuit 110 processes the unmodulated data 116 into modulated data, which is generally indicated by arrow 118, for transmission to the vehicle 104. This data includes, but is not limited to power level information and transmitter ID information. The transmit circuit 110 transmits this information through a plurality of multi-power level data signals, generally indicated in FIG. 1 by arrow 120, to the vehicle 104 via the transmit antenna 112 for further processing. The plurality of multi-power level data signals are transmitted from the fob device 102 to the vehicle 104 as modulated data signals signifying that the fob device is in continuous motion past the predefined motion timeout according to an exemplary embodiment.

According to an exemplary embodiment, the initial bytes of each of the plurality of multi-power level data signals are encoded with a power level. In an exemplary embodiment, the fob processor 108 encodes multiple power levels within the plurality of data signals respectively. As such, within each data signal includes an indication as to the power level at which the data signal is being transmitted. This allows the vehicle 104 receiving the data stream of multi-power level signals to determine the specific power level of each data signal it receives.

The plurality of data signals 120 correspond to predetermined distances respectively in which the vehicle 104 needs to at least be positioned relative to the fob device 102 to receive the respective signal. In other words, the vehicle 104 is configured to receive one or more of the plurality of data signals based on the distance between the fob device 102 and the vehicle 104. For example, fob device 102 may transmit at power level five, four, three, two and one that may correspond to, for example, 200 meters, 100 meters, 30 meters, 10 meters and 5 meters respectively when considered in unencumbered free space. Thus, the vehicle 104, in this example, receives the data signal indicative of power level five when the distance between the fob device 102 and the vehicle 104 is typically 200 meters. As the fob device 102 continuously approaches the vehicle from 200 meters away, the vehicle 104 will sequentially receive signals indicative of power level four, three, two and one signifying that the fob device 102 is approaching the vehicle 104 while continuing to receive the higher power level signals which were able to be received at greater distances as well. Of course, the number of power levels and the distances corresponding to each power level may vary depending on the application and should not be limited to the examples described herein.

In accordance with an exemplary embodiment, the initial bytes of each of the plurality of multi-power level data signals are further encoded with a transmitter ID, which is indicative of the transmitting fob device 102. This enables the vehicle 104 to filter out signals based on power level as well as transmitter ID. As such, the vehicle 104 may be pre-programmed to respond only to a specific fob device, which is identified by its transmitter ID.

In an exemplary embodiment, the fob device 102 transmits at multiple power levels periodically whenever motion is detected. Specifically, the fob device 102 is configured to transmit the plurality of data signals for a predetermined amount of time each time a predetermined transmit period has been reached and as long as the fob device 102 is in motion. For example, the fob device 102 may transmit at all power levels for a few milliseconds every ten seconds as long the fob device 102 remains in motion. If the predetermined transmit period, which in this example is 10 seconds, has not been reached the fob device 102 continues to wait until the transmit period has been reached to transmit again as long as the fob device 102 is in motion. This periodic transmission conserves the battery of the fob device 102. In an exemplary embodiment, the fob processor 108 includes a transmit timer used to track whether the predetermined transmit period has been reached and is reset or refreshed after every transmission.

In accordance with an exemplary embodiment, the vehicle 104 includes a second, receiving antenna 140, a receiver 142, a filter manager 144, a primary processor 146, a memory device 148, and one or more approach devices generally indicated as approach devices 150. The receiver 142 is communicatively coupled to the filter manager 144.

The receiver 142 receives one or more of the modulated data signals from the transmit antenna 114 via the receiving antenna 140. In an exemplary embodiment, the receiver 142 processes the modulated data signals 120 received from the fob device 102 into demodulated data signals, which are generally indicated by arrow 152. During operation, the receiver 142 periodically wakes up to check if a data signal 120 is present. This polling process may be controlled internally by the receiver 142 or by the filter manager 144. If the receiver 142 does not receive a data signal 120 indicating motion in the fob device 102 and that the fob device is within some distance from the vehicle 104, the polling process continues and the remainder of the vehicle or any downstream processing remains in a sleep mode. This allows for the conservation of energy within the vehicle 104. If a data signal 120 is present, the receiver 142 processes the signal and sends the corresponding demodulated data signal 152 to the filter manager 144, which is configured to evaluate the same.

The filter manager 144, primary processor 146, and the memory device 148 are communicatively coupled to one another according to an exemplary embodiment. The memory device 148 includes a predetermined list of signals valid for vehicle reception. The predetermined list of signals includes data, such as transmitter IDs and power levels to which the vehicle 104 is programmed to respond. The filter manager 144 accesses the memory device 148 to filter out signals where the initial bytes are not within the list of valid transmitter IDs and power levels.

The filter manger 144 includes a secondary processor 154 configured to poll the receiver 142 for demodulated signals 152, which represent one or more of the plurality of data signals 120 received, to evaluate the same. In an exemplary embodiment, the secondary processor 154 evaluates the data signals received by comparing the data signals received to the predetermined list of signals valid for vehicle reception. Specifically, the initial bytes of each data signal received are compared to data (valid transmitter IDs and power levels) stored in the memory device 148. The filter manager 144 ignores the remainder of a signal where the initial bytes are not within the list of valid power levels and transmitter IDs. Therefore, encoding a power level and a transmitter ID within the initial bytes of each data signal 120 enables the filter manager 144 to filter/ignore signals based on power level and transmitter ID.

In an exemplary embodiment, the filter manager 144 transmits a wake-up signal and sends filtered data signals, generally indicated by arrow 156, to the primary processor 146 if the data values in the data signals 120 received match the data values stored in the memory device 148. Otherwise, the data signals received are ignored and the remainder of the system remains in a sleep mode. Specifically, the primary processor 146 transitions from a sleep mode to a wake-up mode upon receipt of the wake-up signal. Otherwise, the primary processor 146 remains in a sleep state and any further downstream processing remains at rest. This pre-processing process reduces parasitic current impact to the vehicle 104.

In accordance with an exemplary embodiment, the primary processor 146 further processes the data signals 156 filtered by the filter manager. In an exemplary embodiment, the primary processor 146 determines whether one or more of the plurality of data signals received exceed a message frequency threshold and temporarily ignores one or more of the plurality of data signals from the predetermined list of signals upon one or more of the plurality of data signals exceeding the message frequency threshold. One or more of the plurality of data signals received exceed the message frequency threshold when one or more of the plurality of data signals is continuously present for a predefined time period. For example, if the primary processor 146 sees the signal indicating power level five too frequently (e.g., five consecutive times), the primary processor 146 will temporarily ignore the signal indicating power level five in the predetermined list of signals since only seeing the same signal indicates that the fob device 102 is not moving towards the vehicle 104. If one or more of the plurality of data signals received exceed the message frequency threshold, then further downstream processing remains at rest conserving energy within the vehicle 104.

In an exemplary embodiment, the primary processor activates one or more triggering events in one or more approach devices 150 by determining whether one or more of the plurality of data signals 120 received signifies an approach by the fob device 102. This is accomplished by determining whether one or more of the plurality of data signals 120 received meet predefined approach criteria. The predefined approach criteria may include the detection of one or more transitions between power levels. For example, a signal indicating power level 4 is received followed by the receipt of a signal indicating power level 3 may constitute a valid transition under the predefined approach criteria. Of course, various levels of transition may constitute a valid transition under the predefined approach criteria and should not be limited to the example described herein. For example, a transition from power level four to power level two may constitute a valid transition to activate one or more triggering events.

A triggering event may include, but is not limited to, welcome lighting (head lights, fog lights, etc.) or door unlocking. Of course other triggering events may be activated or enabled when the fob device 102 is near the vehicle 104. Approach devices 150 that may perform one or more trigger events may include, but are not limited to, capacitive sensors, field-type sensors, laser type switches, etc. Of course, other devices or modules that may have various functions can be activated with the presence of the key fob 102.

In one exemplary embodiment, the system uses RSSI to enhance presence detection. Specifically in addition to the power level which is encoded in the initial bytes of each data signal 120, the receiver 142 measures the strength of received signals and provides this measurement to the filter manager 144 and subsequently to the approach detection processor 146 in the form of an RSSI signal. In an exemplary embodiment, the approach detection processor 146 uses the RSSI signal, along with the power level indicated within the data transmission, to further enhance the determination of the approach of the fob device 102. This reconciles whether the data signal 120 received is a valid signal instead of a reflection induced signal (e.g., reflection off a building) or otherwise. Therefore, the approach processor 146 looks at the power levels received as well as the signal strengths at which they are received according to an exemplary embodiment.

Figure 2:
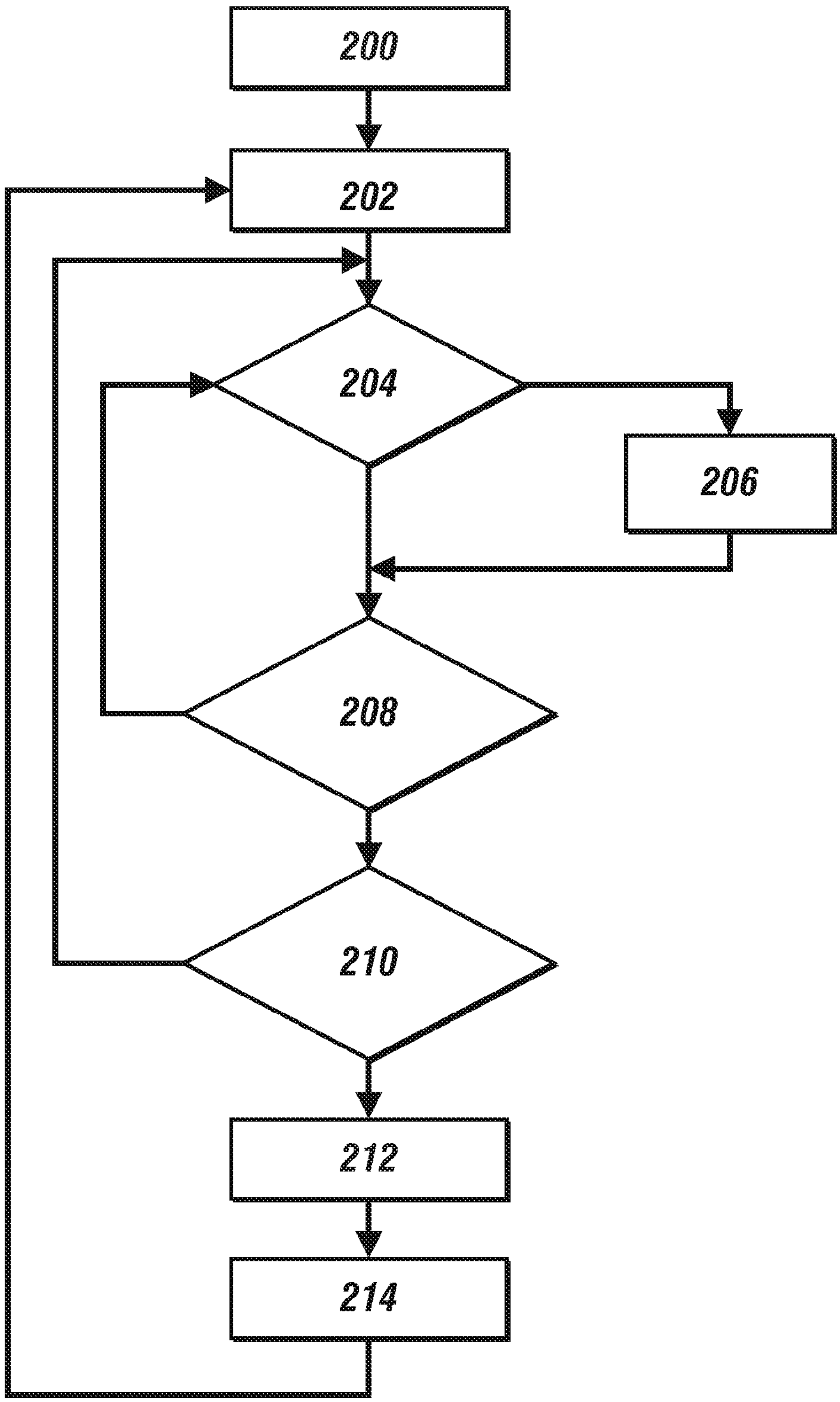
FIG. 2 is a flow diagram illustrating a method of passive approach detection with respect to the fob device according to an exemplary embodiment.

FIG. 2 illustrates a process flow diagram of the fob device 102 implementing a method of passive approach detection. At block 200, begin operation. At block 202, increment timers. The timers being incremented during operation include the motion and transmit timers of the fob device 102 according to an exemplary embodiment. At block 204, determine whether motion is present in the fob device 102. In an exemplary embodiment, sensing device 106 senses whether the fob device 102 is in motion. If the answer to block 204 is yes, then reset the motion timer at block 206. If the answer to block 204 is no, determine whether the fob device 102 has reached a predefined motion timeout at block 208. The fob device 102 reaching the predefined motion timeout signifies that the fob device 102 has been motionless for a predetermined time period. If the answer to block 208 is yes, then return to block 204. If the answer to block 208 is no, then determine whether the predetermined transmit period has been reached at block 210. The fob device 102 transmits at all power levels for a predetermined amount of time each time the predetermined transmit period has been reached and as long as the fob device is in motion according to an exemplary embodiment. If the answer to block 210 is no, then return to block 204. If the answer to block 210 is yes, then transmit at all power levels at block 212. In an exemplary embodiment, the fob device 102 transmits a plurality of data signals 120 corresponding to multiple power levels respectively. Then, reset the transmit timer at block 214. The transmit timer is reset after every transmission.

Figure 3:
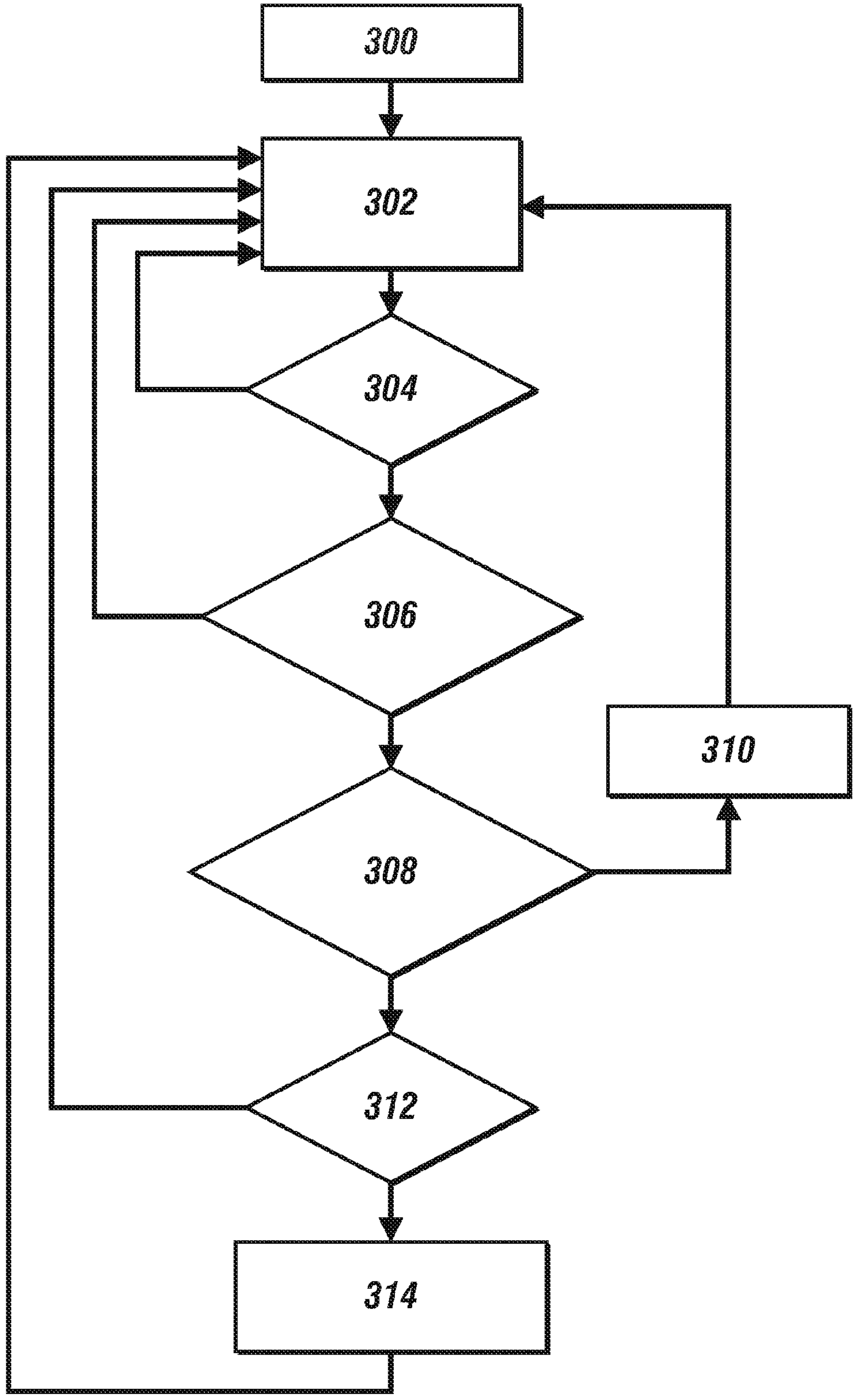
FIG. 3 is a flow diagram illustrating the method of passive approach detection with respect to the vehicle according to an exemplary embodiment.

FIG. 3 illustrates a process flow diagram of the vehicle 104 implementing a method of passive approach detection according to an exemplary embodiment. Begin operation at block 300. At block 302, poll the receiver 142 for a signal 120. Next, determine if a signal 120 is present at block 304. If the answer to block 304 is no, then return to block 302. If the answer to block 304 is yes, then determine if the signal received is in the predetermined list of signals at block 306. The predetermined list of signals includes data, such as transmitter IDs and power levels to which the vehicle 104 is programmed to respond. In an exemplary embodiment, the initial bytes of each signal 120 transmitted by the fob device 102 are encoded with a power level and a transmitter ID. As such, determining if the signal 120 received is in the predetermined list of signals is accomplished by comparing the data in the signal received to data stored within the predetermined list of signals valid for vehicle reception according to an exemplary embodiment. This filtering process is performed by the secondary processor 154 of the vehicle according to an exemplary embodiment. If the answer to block 306 is no, then return to block 302. Otherwise, determine whether the signal 120 received exceeds a message frequency threshold at block 308. This determination may be performed by the primary processor 146 of the vehicle 104 according to an exemplary embodiment. The signal received exceeds the message frequency threshold when the signal received is continuously present for a predefined time period. If the answer is yes, then temporarily ignore the signal received from the predetermined filter list at block 310. As such, the vehicle 104 will keep any further processing at rest until a different signal is received. This conserves energy within the vehicle 104. If the answer to block 308 is no, then determine if approach criteria is met at block 312. Approach criteria may be met by detecting one or more transitions between power levels. Furthermore, the approach criteria may include specific levels of RSSI as measured by receiver 142. This is accomplished by looking at all the different data signals received by the vehicle 104, which may be stored in the memory device 148. If the answer to block 312 is no, then return to block 302. If the answer to block 312 is yes, then activate one or more triggering events and reset approach criteria at block 314.

The processors described herein can be any custom made or commercially available processor, a central processing unit (CPU), an auxiliary processor among several processors associated with the computer system, a semiconductor based micro-processor (the form of a microchip or chip set), a macro-processor, or generally any device for executing instructions. In an exemplary embodiment, each processor comprises a combination of hardware and/or software/firmware with a computer program that, when loaded and executed, permits the processor to operate such that it carries out the methods described herein.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the present application.

What is claimed is:

1. A method of passive approach detection, comprising:

transmitting a plurality of data signals corresponding to multiple power levels respectively from a fob device based on motion detected in the fob device; each of the plurality of data signals includes initial bytes encoded with a power level and transmitter identification (ID);

receiving one or more of the plurality of data signals at a receiver of a vehicle based on a distance between the fob device and the receiver;

filtering out signals at a secondary processor by comparing one or more of the plurality of data signals received to a predetermined list of signals valid for reception; and transmitting a wake-up signal to a primary processor based on the comparison, the wake-up signal enabling the primary processor to transition from a sleep mode to a wake-up mode.

2. The method as in claim 1, wherein the predetermined list of signals includes power levels and transmitter identifications (IDs) valid for reception.

3. The method as in claim 1, wherein the method includes transmitting the plurality of data signals periodically for a predetermined amount of time in response to the fob device being in continuous motion past a predefined motion timeout, the fob device communicating to the receiver in a unidirectional manner.

4. The method as in claim 1, wherein the method further includes:

determining whether one or more of the plurality of data signals received exceed a message frequency threshold; and temporarily ignoring one or more of the plurality of data signals in the predetermined list of signals upon one or more of the plurality of data signals exceeding the message frequency threshold.

5. The method as in claim 4, wherein one or more of the plurality of data signals received exceed the message frequency threshold when one or more of the plurality of data signals are continuously present for a predefined time period.

6. The method as in claim 1, wherein the method further includes:

determining whether one or more of the plurality of data signals received signifies an approach by the fob device at the primary processor; and activating one or more triggering events in one or more approach devices based on the determination.

7. The method of claim 6, wherein one or more triggering events includes welcome lighting in the vehicle.

8. The method as in claim 6, wherein determining whether one or more of the plurality of data signals received signifies the approach by the fob device by determining whether one or more of the plurality of data signals received meet predetermined approach criteria.

9. The method as in claim 6, wherein one or more of the plurality of data signals received meet predetermined approach criteria when one or more transitions between power levels are detected.

10. The method as in claim 1, wherein the method further comprises comparing a signal strength value encoded within each data signal received to valid signal strength values within the predetermined list of signals for reception.

11. A passive approach detection system, comprising:

a fob device configured to transmit a plurality of data signals corresponding to multiple power levels respectively based on motion detected in the fob device; each of the plurality of data signals includes initial bytes encoded with a power level and transmitter identification (ID);

a receiver of a vehicle communicatively coupled to the fob device, the receiver receives receive one or more of the plurality of data signals based on a distance between the fob device and the receiver;

a secondary processor communicatively coupled to the receiver, the secondary processor filters out signals by comparing one or more of the plurality of data signals received to a predetermined list of signals valid for reception; and a primary processor communicatively coupled to the secondary processor, the secondary processor transmits a wake-up signal to the primary processor based on the comparison, the wake-up signal enables the primary processor to transition from a sleep mode to a wake-up mode.

12. The system as in claim 11, wherein the predetermined list of signals includes power levels and transmitter identifications (IDs) valid for reception.

13. The system as in claim 11, wherein the plurality of data signals are transmitted periodically for a predetermined amount of time in response to the fob device being in continuous motion past a predefined motion timeout, the fob device communicates to the receiver in a unidirectional manner.

14. The system as in claim 11, wherein the primary processor determines whether one or more of the plurality of data signals received exceed a message frequency threshold and temporarily ignores one or more of the plurality of data signals in the predetermined list of signals upon one or more of the plurality of data signals exceeding the message frequency threshold.

15. The system as in claim 14, wherein one or more of the plurality of data signals received exceed the message frequency threshold when one or more of the plurality of data signals are continuously present for a predefined time period.

16. The method as in claim 11, wherein the primary processor determines whether one or more of the plurality of data signals received signifies an approach by the fob device and activates one or more triggering events in one or more approach devices based on the determination.

17. The system as in claim 16, wherein the primary processor determines whether one or more of the plurality of data signals received signifies the approach by the fob device by determining whether one or more of the plurality of data signals received meet predetermined approach criteria, one or more of the plurality of data signals received meet predetermined approach criteria when one or more transitions between power levels are detected.

18. A passive approach detection system, comprising:

a fob device configured to transmit a plurality of data signals corresponding to multiple power levels respectively based on motion detected in the fob device; each of the plurality of data signals includes initial bytes encoded with a power level and transmitter identification (ID);

a receiver of a vehicle communicatively coupled to the fob device, the receiver receives one or more of the plurality of data signals based on a distance between the fob device and the receiver;

a secondary processor communicatively coupled to the receiver, the secondary processor filters out signals by comparing one or more of the plurality of data signals received to a predetermined list of signals valid for reception; and a primary processor communicatively coupled to the secondary processor, the secondary processor transmits a wake-up signal to the primary processor based on the comparison, the wake-up signal enables the primary processor to transition from a sleep mode to a wake-up mode;

wherein the plurality of data signals are transmitted periodically for a predetermined amount of time in response to the fob device being in continuous motion past a predefined motion timeout, the fob device communicates to the receiver in a unidirectional manner.

19. The system as in claim 18, wherein the primary processor determines whether one or more of the plurality of data signals received signifies an approach by the fob device and activates one or more triggering events in one or more approach devices based on the determination.

* * * * *